(12) United States Patent
O'Brien

(10) Patent No.: US 6,303,133 B1
(45) Date of Patent: Oct. 16, 2001

(54) FILM-SPREADING POWDER FOR SUPPRESSING WATER EVAPORATION

(76) Inventor: Robert Neville O'Brien, 2614 Queenswood, Victoria BC (CA), V8N 1X5

( * ) Notice: Subject to any disclaimer, the term of this patent is extended or adjusted under 35 U.S.C. 154(b) by 0 days.

(21) Appl. No.: 09/192,298

(22) Filed: Nov. 17, 1998

(51) Int. Cl.$^7$ ................................................. A01N 25/08
(52) U.S. Cl. ........................... 424/409; 422/42; 422/43; 509/162; 252/381; 252/383; 252/384
(58) Field of Search .................. 424/409; 502/162; 422/42, 43; 252/381, 383, 384

(56) References Cited

U.S. PATENT DOCUMENTS

| | | | |
|---|---|---|---|
| 3,391,987 | * 7/1968 | Myers | 21/60.5 |
| 3,415,614 | 12/1968 | Egan | 21/60.5 |
| 4,250,140 | * 2/1981 | Rowlette | 422/43 |
| 5,120,697 | * 6/1992 | King | 502/162 |

FOREIGN PATENT DOCUMENTS

47029290 * 11/1972 (JP) .

OTHER PUBLICATIONS

Insoluable Monolaters as Liquid/Gas Interface G L Gaines Interscience N.Y 1966.
Retardation of Evaporvation by Monolayers V K La Mer Academic Press N.Y 1962.
An Investigation of Monolayer Spreading Speros at the Air/Water/Interface Al Feher University of Victoria 1975 (12–197S).

* cited by examiner

*Primary Examiner*—Thurman K. Page
*Assistant Examiner*—Lakshmi Channavajjala

(57) ABSTRACT

The invention pertains to enhancing the dispersion on the surface of a still or moving body of a polar liquid, such as water, of particles of a powder of the composition essentially comprising a monolayer-forming constituent, such as hexadecanol or octadecanol or a blend thereof, together with a high proportion of a soluble or sparingly soluble alkaline earth metal hydroxide, more particularly about five times the monolayer-forming constituent's weight when the hydroxide constituent is—as preferred for potable water evaporation reduction—calcium hydroxide procured as inexpensive pre-powdered agricultural hydrated lime. A melt-processing manner of producing the composition is described. When particles of the composition contact the body of water, so long as lime remains present in any floating particles, they will be individually positively charged, resulting in their repulsion from one another. This enhanced dispersal effect is due to the ionization of the calcium hydroxide.

1 Claim, No Drawings

FILM-SPREADING POWDER FOR SUPPRESSING WATER EVAPORATION

BACKGROUND OF THE INVENTION

Technical Field

In general, this invention relates to a chemically unreactive method of making a film-spreading powder specifically for use in conservation of drinking water supplies in outdoor impoundments including reservoirs, canals, and the like, which combines in particles thereof organic and inorganic compounds comprising, respectively: (a.) a substantially water-insoluble constituent which is known to form an evaporation retardant monolayer or ie. thin film on the evaporating free surface of a body of water, either at rest or in motion; and (b.) a water-soluble dispersing and bulking constituent which commences separation from the monolayer-forming constituent when the powder of mixed composition is deposited on the water.

It is known in the art of forming evaporation retardant monolayers on water to employ substances which immerse, into the water, hydrophilic terminal groups at one end of certain long-chain organic molecules which at the same time extend hydrophobic hydrocarbon portions of the chains upwardly into the air in parallel packed array. Aliphatic, ie. 'fatty', alcohols such as cetyl and steryl alcohols—a.k.a. respectively: hexadecanol and octadecanol—reliably manifest that orientation and form monolayer films which slow the evaporation rate by requiring upwardly escaping water molecules to expend energy in forcing adjacent molecular chains sufficiently apart to pass between them.

Another evaporation reducing mechanism complementary to that energy barrier mechanism is also known to be operative when the evaporating water surface is not smooth, but is rippled due to either prevailing air or water currents. A change in surface properties associated with the spreading of a monolayer suppresses the ripples, and this second effect reduces the roughness factor and surface area of water exposed to air, thus undoubtedly reducing the base rate of water evaporation from a surface of given perimeter. The resulting lesser number of escaping water molecules will of course still have to pass through the energy barrier of the abovementioned chief mechanism, which is operative both when the water surface is smooth and when rippled.

Since some rippling is so commonly present in outdoor settings, it is worthwhile to provide any improvement in composition properties which can enhance the ripple-smoothing effect, so long as the chief mechanism is not jeopardized; and, among other things, the present invention involves such an improvement.

Two highly recommended texts which are entirely devoted to the subject of monolayers, their formation, and other uses, are: *Insoluble Monolayers at Liquid-Gas Interfaces*, G. L. Gaines, Jr., Interscience Publishers, (New York, 1966); and, *Retardation of Evaporation by Monolayers*, edited by V. K. La Mer, Academic Press (New York, 1962)—hereinafter cited as LA MER.

It is timely to intensify reconsideration of known techniques and compositions for evaporation suppression, in order to improve humanity's stock of drought-fighting means, because there are seems to be an ominous character to currently changing weather patterns, including droughts. The changing patterns appear to be attributable in the short-term to the El Nino warming phenomenon in the Pacific Ocean, and in an indefinitely prolonged long-term timeframe to global warming associated with 'greenhouse gases' emissions. On the occasion of a global warming conference at Georgetown University on Oct. 7, 1997, the President of the United States declared that the "potential for climate disruption is real".

Against a background of such concerns, contemporary workers in the art of monolayer formation will want to give intensified reconsideration to means for improving generally familiar techniques and types of compositions useful for the conservation of water supplies. For example, there has been a long-standing need for improved means whereby evaporative losses can be reduced under more adverse conditions of wind, and of water currents, than those under which prior art workers were able to establish and maintain effective monolayer films. Also, it seems noteworthy that by comparison to the amount of reservoir coverage work reported in the literature, film formation on running bodies of water has been relatively neglected, though attention to this matter is warranted by such facts as that millions of Californians depend on water supplies which course for hundreds of miles in uncovered channels traversing arid or semi-arid distincts where evaporative losses are high.

Because the present invention relates to a powder, it may seem natural to expect that the chief problem with wind where powder is used must be that wind is apt to blow the powder uselessly away from the water surface one is intending to cover. That deserves consideration in the context of equipment and techniques of distribution, but is not so great a problem—nor nearly so recalcitrant—as problems which concern adverse wind effects not on powder before it reaches the water surface but on a film after its initial formation on the water, during the stage when it should be spreading, and/or after coverage of a substantial area has already been attained. Tangential drag force due to wind affects monolayers indiscriminately, whether the composition applied to the water is initially distributed in either a solid-phase or liquid-phase state.

Light surface winds no greater than about two to five mph are viewed as initially helpful in establishing the desired full coating of a reservoir, and a common practice has been to distribute a monolayer-forming substance on water along an upwind shoreline, taking advantage of a drift effect which assists the spreading film to more quickly reach the opposite shoreline than with zero wind assistance. Ideally, the wind-speed should drop and/or wind direction reverse, once the drilling has taken a film far enough downwind. Wind is rarely that cooperative, and as the Australian researcher R. G. Vines has explained with regard to a mode of wind-caused film coverage loss called 'retraction'; "a monolayer, bounded downwind by a shoreline, is compressed by the wind and collapses." (LA MER, p. 147) The terms 'compression' and 'collapse', in the art jargon, do not refer to vertical reduction of thickness but to reduction of the plane area covered by the monolayer produced by a given quantity of film-forming substance. The area covered when an aliphatic alcohol monolayer is most highly resistant to evaporation through it, because it is in a 'condensed' state, corresponds to an optimal degree of compression.

Over-compression to the point of film collapse reduces the net gain of the condensed state effect by causing an actual reduction of the area covered, and this is often what happens in the field, due to wind. Also, the spreading and/or respreading by monolayers at varying 'film pressures' (in the plane of the monolayer, not normal to it) is a rather complicated function of many factors, including: hydrocarbon chain length of substances used; polymorphism of the higher alcohols which show three or possibly more different crystal forms; history of materials preparation and storage; the temperature of the body of water; even its pH sometimes;

and, convection events or currents in the water, when present. One ambitious attempt to take all such matters into account is found in a doctoral dissertation I supervised, entitled: *An Investigation of Monolayer Spreading Speeds at the Air-Water Interface,* by A. I. Feher, University of Victoria (1975). Unfortunately, when all of the foregoing and even other factors are theoretically favorable to spreading, a wind may rise or change direction, and either outright defeat a film-forming effort, or else incur high costs due to an increase of the volume of film-forming material distributed in excess or on a continuous basis in an attempt to make up for film losses caused by high wind and usually attendant wave action.

PRIOR ART AND RELATED PROBLEMS

In the United States, in 1957, at Rattlesnake Reservoir in Colorado, experimental evaporation reduction work by the Bureau of Reclamation showed that: "Broadcast application of powdered hexadecanol from a boat produced excellent results." (LA MER, p. 184) In 1960, the Bureau of Reclamation found that 1000-acre Sahuaro Lake near Phoenix, Ariz., could usually be film-covered in less than one hour using a boat-mounted dusting machine to broadcast powdered hexadecanol (ibid., bottom p. 189).

Meanwhile, in Australia, for several months in 1959–60, the researcher R. G. Vines, whom I quoted above, mechanically abraded solid blocks of aliphatic alcohol immediately before dusting the freshly made powder onto large water storage impoundments—Umberumberka Reservoir in New South Wales and Lake Corella in Queensland—using modified agricultural dusting equipment, also mounted in a boat. Again, encouraging water-saving results were produced, reported in Vines' contribution to the LA MER text (ibid., pp. 137–160). In my opinion, the powder broadcasting technique has merit and should be extended from application in conjunction with the aliphatic alcohols alone (or blend of homologues with one another) to powders of a composite character, ie. including a constituent which does not itself form a monolayer, but which enhances in some way the film-forming technique.

A few inventors have turned away from the early quite promising powder broadcasting method, while nonetheless continued to produce solid-phase compositions, sometimes combining long-chain alcohols with one or another water-soluble additive, its commonest function being to promote a certain rate of release of film-former as the additive dissolves. The solid-phase compositions disclosed in the three patents next cited could conceivably be divided into fine particles for distribution upon the water according to the powder broadcasting method.

1. U.S. Pat. No. 3,391,987 (Jul. 9, '68), COMPOSITION AND METHOD FOR RETARDING EVAPORATION, by Lloyd E. Myers, discloses a composition in which the evaporation retardant is the usual hexadecanol, octadecanol, or blend thereof, admixed in a "matrix" or "carrier" provided as a dissolving constituent selected from a wide range of saccharides. The specific selection of type and/or the proportion of saccharide used, and/or the initial size and shape of molded bodies, (floating and/or sinking), is meant to afford a measure of control over rates of release of the film-forming constituent "tailored to local conditions—such as air and water currents, water and air temperature, etc." (Col. 2, lines 21–34) I believe this tailoring idea to be most applicable to sites where stable but in some (unspecified) way less-than-ideal conditions persist for long periods of time. Curiously, one sub-set of possible local conditions which respect to which all examples of the invention by Mr. Myers are inherently non-tailorable was left out of consideration: when conditions are ideal there is certainly no need for continuous release of material. That would just be wasteful. Long-chain alcohol films are known to persist for days under ideal conditions, based on a single application of enough material to cover a reservoir surface.

Of the three prior art patents herein cited, only this one expressly rejects broadcast distribution of a film-releasing powder. "Attempts to develop powder dispensers were not successful because of mechanical problems and the caking of the powders." (Col. 1, lines 41–44) Truly, commercially supplied long-chain alcohol flakes are waxy, soft, and difficult to grind, but the problem can be solved in a variety of ways, including my own described below, and by R. G. Vines' method, with which Mr. Myers apparently was familiar (cf. Col. 2, lines 2–9) since his patent states, "A scheme has also recently been devised for using a power driven rotary brush to abrade particles from a solid cake of alkanol and a blower to distribute the particles over the water surface." Contrary to the further objection that two persons are needed to operate the boat-mounted equipment (an impression most likely drawn from a look at the photograph in LA MER on p. 138), Mr. Vines reported that a solitary reservoir caretaker could cover up to one square mile in under two hours, and that the powder broadcasting technique was already, as of 1962, nearly automated (ibid., pp. 151/150). Consistent preference for continuous release of retardant is Mr. Myers' conceptual basis for rejection powder broadcasting: it "does not provide continuous release of retardant." Candidly, I doubt that any substance exists which can be intermittently released but cannot be released continuously so long as supplies hold out, and vice versa. Not only can a powdered composition be distributed on a continuous basis if desired, a block from which a film-forming material is released when the block is immersed in water could be lifted from the water by simple means whenever cessation of the release process is desired. Nothing said here impugns the ingenius use of a saccharide as a dissolving agent in admixture with a film-forming compound, and I believe there would be merit in trying any of the compositions of EXAMPLES 1–5 for use in powdered form.

At only one place (Col. 4, lines 4–6, MYERS) is a technical problem with wind specifically addressed, and not by 'tailor-making' a composition for windy localities: "In any event where floating blocks are used, it is preferred that they be anchored against wind movement." I observe that this anchoring expedient demonstrates clearly that saccharide dissolution is incapable of providing any kind of motive power which might enable progress of a floating film-forming solid in a direction either against a headwind or up the slope of a ripple in the water, and this would remain true even if the unit were not a block but were a powder particle of identical chemical composition as a block.

One method of manufacture of a composition according to the MYERS patent involves heating "at least the retardant" so as to conveniently liquify it to facilitate high shear admixture with the carriers (Col. 3, lines 38–42).

2. U.S. Pat. No. 3,415,614 (Dec. 10, '68), PROCESS AND COMPOSITION FOR RETARDING WATER EVAPORATION, by Richard R. Egan and Stanley R. Sheeran, discloses use of a heterocyclic spreading agent. Doubt that films formed from long-chain alcohol can be spread on large bodies of water without benefit of a dispersing agent is expressed. (cf. Col 1, lines 49–58) Reports from Rattlesnake Reservoir, Umberumberka Reservoir, Lake Corella, and Sahuaro Lake apparently had not come to the co-inventors' attention. The fact that hexadecanol spreads spontaneously on water to form a mono-layer is one of the better known facts in the whole field of art, but an experiment is offered (Col. 1, lines 58–62) which demonstrates that a "piece of cetyl alcohol" does not push a talcum powder coating on water aside. The experiment is not particularly simulative of field practice spreading a powdered aliphatic alcohol on reservoir which would not normally be pre-coated with talc.

In this art it is proposed to centrally anchor, for three-month coverage of a six-acre reservoir, a ten pound floating block comprising from 5% to 25% by weight of tetrahydrofuran, tetrahydrofurfural alcohol, or other heterocyclic compound, the main balance of the mix being an aliphatic alcohol or blend of such alcohols. The recommendation of central anchoring seems significant, and to indicate confidence of the co-inventors in the spreading power they achieve, since apparently there is only detrimental wind drift if winds are "severe" (Col. 3, line 24). If there were not a very exceptional spreading power provided, floating a block at the center of a reservoir would tend in virtually all conditions of wind to produce less coverage, or take more time to obtain or re-establish full reservoir coverage, in my opinion, than if positioning of the block from which the film spreads took wind direction into account. Unfortunately, how a furan derivative enhances spreading power is not explained in the disclosure, although it may be inferred that removal of the furan "from the alcohol by the water" (Col. 1, line 70) plays an important role. Credit is due to the co-inventors here for pointing in the line just cited to a clear principle according to which all three of the citations of patented art herein, right alongside the invention herein disclosed, may rationally be subclassified together with one another: all are compositions wherein separation of a film-forming substance from another constituent is achieved by bringing the composition into contact with water. We are all rather close in art in that respect, as well as with respect to resort to melt processing.

As in the MYERS patents, here too, mixture preparation involves melting the normally solid-phase alcohol. (Col. 2, lines 59–61)

The furan-containing composition can if desired by produced otherwise than in blocks for centralized anchoring, specifically: in "pellets, beads, or other finely-divided forms" (Col. 3, lines 25–26). In their disclosure, Mssrs. Sheeran and Egan seem to have wanted to reserve use of the word 'powder' solely for reference to calcined talc, but it seems sensible to assume that the meaning of their phase, "other finely-divided forms", encompasses particles of small dimensions as in a powder.

3. In U.S. Pat. No. 4,250,140 (Feb. 10, '81), disclosing a METHOD AND COMPOSITION FOR RETARDING WATER EVAPORATION, inventor John J. Rowlette prefers "a solid compacted evaporation retardant tablet, pellet, briquette, or other unit" wherein a water-soluble polyethylene glycol, viz. CARBOWAX 4000 made by Union Carbide, is present in solid solution with the usual film-forming "saturated aliphatic interface-active hydrocarbon". One example presented at Col. 3, lines 46–53, discloses presence of the glycol in a one-to-ten ratio with octadecanol, these two essential constituents in this case together comprising 38.5% by weight of a tablet-making formula featuring a 61.5% content of various water-soluble and gas-producing additives mixed and compacted with but apparently not "in solid solution" with the essential aliphatic alcohol/polyethylene glycol particles produced as described at Col. 2, lines 64–68.

The highly filled and specially hardened swimming pool treatment tablets intended for marketing to re-supply a separately patented dispenser could conceivable be either distributed as is upon the surface of a large body of water or could be crushed to form a powder for the broadcast method of distribution, but the cost of production and/or price expected for swimming pool tablets would likely make these options prohibitively expensive. The invention of U.S. Pat. No. 4,250,140 (ROWLETTE) is, however, of much broader scope than the tablets themselves, and encompasses a simpler two-constituent version combining just the aliphatic substance and polyethylene glycol, a powdered embodiment of which is contemplated at Col. 4, lines 40–45.

The film-spreading mechanism contributed by polyethylene glycol's chemical properties is not explained: nor is any technical reason given for using a spreading agent which is "soluble in the hydrocarbon"; nor can it be ascertained from the disclosure how liquid water gains access to glycol in solid solution with the water-insoluble constituent. This would seem an issue of relevance with respect especially to unsubmerged upper portions of floating powder particles formulated without the gas-emitting and other ingredients which in compacted tablets doubtlessly promote disintegration of the tablets in a manner inapplicable to a particle of powder lacking those extra ingredients.

In this third and final example of patented art cited herein, the word 'wind' appears not even once.

As in the two previous citations, melting of the evaporation retardant is involved at the mixing step. (Col. 2, lines 64–66)

Citations 1. (MYERS), 2. (EGAN/SHEERAN), and 3. (ROWLETTE) provide useful film-releasing compositions which, if supplied in a powder version for broadcasting onto water in the general manner pioneered by the Bureau of Reclamation workers in the U.S.A. and by R. G. Vines in Australia, would be directly competitive with the product according to the present invention.

The respective saccharide, furan, and glycol additives featured in these citations, however, do not apparently contribute technical effects wherein separated particles containing such additives would derive from their dissolution a motive power capable of driving a particle either up the slope of a ripple in the water, or in horizontal motion against a headwind. At least, if it were the case that this capability was afforded, it was not mentioned. Not only with relation to that point, but with respect to using a second constituent which is inorganic rather than organic, the present invention is readily differentiated from the cited patents, notwithstanding the basic idea of two constituents which separate upon contact with water is adopted in all four cases. The essential dissolving constituents of the cited prior art patents are organic compounds.

A final detail with which to close this background concerns the use of sugar in the MYERS patent. Its inclusion as a water-soluble carrier or matrix was generally directed therein more to slowing down release of the film-forming alcohol than to hastening separation of the alcohol from any and all other possible constituents contemplated; and accordingly I do not construe the use of sugar in the MYERS patent as anticipating its optional use as an accelerant to speed dissolution of a sparingly soluble inorganic constituent blended with a monolayer-forming alcohol in a differentiable evaporation retardant product.

SUMMARY OF THE INVENTION

Provision of an in-built chemical mechanism which enhances dispersal of film-releasing particles upon contact with water by actually propelling the particles to a short distance apart from one another is a major object of the present invention.

An inexpensive process for manufacture of a drought-fighting aid in the form of a storable, shippable, and non-caking powder, obtained without resort to R. G. Vines' method of onsite block abrasion to produce powder just before broadcasting it, is another major object of the invention, as is provision of a product for evaporation retardation which is conveniently dispensed from simple equipment such as hoppers and blowers, including agricultural dusting equipment or industrial spraying equipment mounted either in stationary installations or in mobile units such as boats.

A unique method of forming on a body of water, still or moving, an evaporation retardant film featuring a superior capability for self-repair and re-spreading following its mechanical disruption by causes like wind and/or wave action, is yet another object of the invention, as is provision of a composition with particular effectiveness at smoothing out ripples in the water surface, either when the ripples are wind-caused or caused by flow phenomena associated with flow over an uneven submerged surface, or with changes in flow conditions associated with hydraulic grade variations, which can also cause water surface undulations even in artificial channels.

It can be understood that various dissolving constituents for admixture with a film former have been selected by other workers in the art, without presentation in their cases of much elucidation of the initial selection criteria borne in mind when devising the compositions. In the present case, two key criteria, for selecting the constituent which is to be separated by exposure to water from the film-forming constituent left floating at the surface, have been that the substance selected (first) should facilitate the process for producing the mixed composition as a powder, and (second) should, in use on the water, produce a motive force ensuring an optimum minimum distance between particles of powder which otherwise would tend to agglomerate and/or be pushed together by environmental factors such as wind and the slope of ripples.

Usual criteria of cost and availability, safe handling properties, and ecological harmlessness had also to be kept in mind. A further technical criterion involved avoiding a substance of so great a density that surface tension of water would be of negligible effect in supporting a powder particle containing a large proportion of the substance at the surface. A net particle density extending that of talc particles of comparable size would best be avoided.

According to the invention, with one part by volume of water-insoluble constituent 'A', comprising a long-chain saturated organic compound having a polar endgroup—such as do hexadecanol and octadecanol—there should be mixed into a melt of the 'A' constituent from about 2 to 3.5 parts by volume, i.e. approximately 5 parts by weight, of an ionizable bulking and dispersing constituent 'B', comprising a pre-powdered sparingly soluble hydroxide of one of the 'alkaline earth metals', preferably calcium hydroxide. In a melt kept heated well above the normally solid-phase alcohol constituent's melting point during the mixing step, molten hexadecanol and/or octadecanol (or a blend thereof) readily mixes with stirred-in pre-powdered calcium hydroxide, inexpensively procurable as hydrated agricultural lines. The slaked lime does not dehydrate, or lose it particulate character when stirred into the molten film former, and the lowered viscosity of the molten alcohol constituent allows its contact with virtually all the lime particles, tending to wrap about and to be smeared upon those which are not broken, to fill microscopic fractures in some particles, and in some instances to bind small fragments together.

Heat is transferred to the lime particles in a manner which I believe promotes development of an essentially amorphous 'glassy' phase of alcohol, which will upon later contact with water spread as a film more readily than does the same substance when distributed in a normally crystallized phase.

The herein disclosed process of powder production mechanically combines the film-forming constituent with the hydroxide, without chemical reaction between the very different types of constituents, without the regularity of structure expected in a compound, and without effecting solution of either constituent in the other.

After a cooling step in manufacture, a few small lumps might sometimes remain due to uneven stirring events, but these can be easily reduced when, along with all of the mixed material, a preferred endproduct particle size is established according to usual procedures, eg. by scalping through a sieve and/or by passing material through a simple roll mill.

The powder is storable, shippable, and is suitably fluent for dispensing from either stationary or mobile equipment. When the powder embodying the invention is broadcast onto the surface of polar liquid to be coated, mutual repulsion of particles occurs due to their acquisition of like positive charges as the calcium hydroxide ionizes, since its negatively charged hydroxyl ions are much more mobile than the calcium ions with positive charges. The resulting mutual repulsion of nearest particles is strong enough to initially scatter them along the liquid surface in all directions, including the direction against a headwind, or up the slope of a ripple. Even in the presence of a headwind up to about ten miles per hour, the many particles dispersing in the direction against the wind are not pushed back by wind upon one another, and agglomeration is prevented.

Three factors which should not be conceptually confused with one another contribute to the net area coverage of a liquid surface with an evaporation retardant film produced using the composition according to the present invention: (one) the mechanical—typically aeromechanical, ie. air-sprayed, distribution of particles onto the surface, (two) electrostatic dispersion of the particles repulsed from one another on the surface, and (three) the spreading of a monolayer from the film-forming constituent. The last two processes typically overlap in time, and, depending on rate of application, timing, and directing (aiming) of the powder distribution in the first place, all three may overlap. The composition was created in contemplation of an optimal manner of coordination of these three processes, so as to make it possible to attain respectable coverages in more adverse conditions than usual.

DETAILED DESCRIPTION OF A PREFERRED EMBODIMENT OF THE INVENTION

The particular composition preferred for an embodiment of the invention intended primarily for use to conserve potable water supplies combines an aliphatic alcohol film-forming constituent, preferably cetyl alcohol (hexadecanol), and a pre-powdered calcium hydroxide ionic dispersing and bulking agent, to make a finely divided powder that disperses on the surface of the water when distributed thereon to enact a method of evaporation reduction by means of the resulting monolayer consisting of the alcohol constituent.

Exposure of the calcium hydroxide to the water causes its ionization wherein hydroxyl ions of negative charge are released at a rate about three and one/third times faster than the calcium ions of positive charge. For the period of time while some calcium hydroxide remains present in the particles, they will be positively charged, resulting in repulsion between particles, while, at the same time, monolayer formation and spreading from the film-forming increment of each particle commences and continues.

The desired coordination of these two effects is fundamentally a matter of proportioning the constituents and sizing the particles. Too small an increment of film-former in too big a particle would represent one kind of off-design defect, while a particle with a specified 1-to-5 parts by weight of film-former to hydroxide would benefit little from this good proportion if the particle size were so excessively small that the duration of the ionic effect would be too brief. Sizing of particles which are inhomogenous and which expose at their surfaces two radically different kinds of substances is a somewhat different matter from sizing particles consisting of monolayer-forming solids alone, wherein faster film formation from a given mass of film former has long been known to result from merely increasing the exposed perimeter at the triple interface of solid-liquid-gas by resort to fine grinding.

A further detail requiring coordination is of course the spaced pattern of particles as they are trajected onto the water surface. It is vital to avoid producing too sparce of an initial spacing of particles striking the water, because that could make the distance between them exceed the range at which the repulsive force of like-charged particles is effective to propel them away from one another.

With regard to producing these special particles of mixed composition, there are details of the melt processing procedure to note. The melting point of hexadecanol is about 49.5° C., of octadecanol: about 57.9° C., but it is desirable to raise the melt temperature to at least about 90° C. for the mixing step, to reduce viscosity, and since it is more convenient to mix in pre-powdered calcium hydroxide which has not itself been pre-heated, and which will of course receive heat from the melt. Heat may be applied during the course of mixing, but the mixing step is preferably conducted rapidly enough that the bulk of the hydrated lime constituent need not reach the highest temperature of the alcohol melt. A thorough mixing but without shear so high as to undesirably diminish the lime's particle size too much is recommended. A visual surprise in store for a first-time preparer of the composition is that it looks at a certain point during the mixing as though merely a paste will result, but then, rather remarkably, the powder character of the calcium hydroxide constituent is both preserved and substantially conferred on the whole mixture as thermal equilibrium is reached following removal of a mixed batch from the heating source for cooling to below 35° C.

Although this mixing process involves neither solvation nor chemical reaction between the constituents, that is far from meaning that effects of the presence of the calcium hydroxide on the aliphatic alcohol constituent as it cools from the melt are negligible. Indeed, it appears that important previously unreported effects occur, which may be tentatively hypothesized to involve an amorphous (ie. non-crystallized) phase of the film former.

It is thought that when the 'Vines technique' of immediate pre-broadcast abrading of particles from a waxy block produced a powder with excellent film-spreading properties, an advantage was gained by employing material with a lesser degree than usual of stabilizing lattice energy in the solid bulk form. Also, in the dissertation research of A. I. Feher, it was found that waxy material had a higher initial spreading rate than crystalline material. Samples with a higher lattice energy are expected to be more stable in the bulk form and hence to exhibit a lower spreading rate. While not wishing to be bound by the theory, I believe that the new composition herein disclosed, by virtue of the manner of 'hydroxide-smothered' processing in the melt, produces a low lattice energy and enhanced film-spreading property in the fatty alcohol film former.

More immediately apparent and verifiable by simple inspection is a reduction of cohesion between increments of aliphatic alcohol carried by adjacent particles in the dry composition, by comparison to flakes of the unmixed substance which perceptibly tend to cohere under even slight pressure.

Returning to the physical state of the cooled mixture en masse, it was noted in the SUMMARY that a few lumps may remain. Depending on quality control considerations there are various options regarding the material which is derived by crushing the lumps. It may not be necessary to pass all material through a roll mill for crushing. If analysis (which should be conducted from time to time) shows a significant deficiency of alcohol content in lumps separated by scalping using a sieve, it is desirable to re-process crushed lump material with the next batch at the melt-mixing step; if not deficient, the powder from crushed lumps can go along with sieved material originating in the same batch where the lumps occurred. When mixing goes particularly well, it becomes feasible to use agitated sieves alone, dispensing with use of the roll mill. As in most cases of dry and friable materials containing now and then a few lumps, attrition processing (gravity-driven) is also applicable: fresh material falling upon already fallen material is often enough to produce considerable size diminuition of lumps. Another breaking-up technique would be judicious use of air blasts directed into lumpy powder batched onto well-hooded sieves, if a crushing roll is not available but compressed air is.

Sizing particles for the endproduct is not a matter solely of considering use properties; it is desirable to facilitate mass-production by avoiding difficulties in conveying powders consisting of particles with average diameters of 20 microns or less. The Bureau of Reclamation experiments employed a fine powder of about 100 microns in average particle diameter. When R. G. Vines broadcast his uniquely on-site produced particles, he estimated their size to range from 0.01–0.1 mm, ie. from ten to one hundred microns, but it should be noted that there was no in-plant handling and/or conveying of the ten micron particles at the smaller end of that range involved. I prefer a particle size in the range of from about 0.05–0.1 mm. For sieves, a mesh size of 270 which allows particles of 53 microns diameter and smaller to pass through would be acceptable as the bottom of a two-sieve arrangement where the product is taken from between the sieves. A 150 mesh sieve at the top would scalp off all particles above 105 microns in diameter. Scalped off oversize particles (and lumps), together with passed-through undersize particles can be reprocessed with new batches, as mentioned above, bearing in mind need for periodic analysis to check on aliphatic alcohol content.

As indicated in the SUMMARY already, the composition of the present invention is compatible with a wide variety of existing powder dispensing equipment. What is of particular interest to note in connection with use of multiple strategically stationed automatic dispensers—an idea which is old in the art—is that a new and significant economy is now feasible due to the particles' self-dispersing feature: the dispensers may be stationed farther apart from one another than otherwise, and thus fewer of them are needed for a given coverage. For establishment of an evaporation retardant film on water conveyed in a large uncovered channel, dispensers may be underslung from an overhead bridge or catwalk spanning the channel.

If desired, an additional long-chain surfactant not of the homologous series of alcohols, but also a film-former, such as a straight-chain alkyl sulphonate—better known for use in biodegradable detergents—is optionally includable in the mix. Keeping the alcohol-to-hydroxide ratio the same, a volume of this sulphonate of from 1% to 10% by volume of the calcium hydroxide has been found useful to add, though not necessary to practice of the invention. The sulphonate employed is anionic, and interference with ionization of calcium hydroxide does not occur. Electrochemistry would rule out a number of secondary additives.

Sugar is not ruled out, however, and its known accelerative effect on dissolution of calcium hydroxide can be helpful when water temperature is high. Solubility of calcium hydroxide in water decreases with increased water temperature—the reverse of the case with most substances.

The ionic dispersing effect of the basic composition, which is its most notable feature, can play a significant role when excess particles are distributed atop an already formed file. If wind or wave action causes breaks in the film, particles dropping into place will automatically be dispersed in the region requiring film repair, in a highly advantageous fashion. Also, in cases where a formed film is being disadvantageously compressed against a downwind shoreline, it is feasible, with use of a high-velocity spray of particles downward against the surface near that shoreline, to at least for a time sustain a dispersal of material against the wind.

With respect to possible embodiments of the invention other than that which has been described as preferred especially for conservation of public water supplies, attention is drawn to other metal hydroxides which would be ionizable in a polar liquid. From the same group (IIA) as calcium, the two other elements forming hydroxides which would perhaps not be prohibitively costly for special purposes are magnesium and barium. Magnesium hydroxide, however, is about a hundred times less soluble in water than in calcium hydroxide. Barium hydroxide, on the other hand, is more soluble. Also, the densities of the hydroxides of magnesium and barium would be lower and higher, respectively, than for calcium hydroxide. The net consequences of radically different magnitudes of solubility and density properties, plus a variation as to charge acquisition, would obviously require consideration when proportioning mixes with a film former for any special purpose.

For combination with the usual film formers, calcium hydroxide, widely available in conveniently pre-powdered form as agricultural hydrated lime, cannot be beaten for its low cost and virtually ideal effectiveness for producing a superior composition for ionic dispersion of an evaporation retardation to save water. Fortunately, the heretofore specified mode and purpose of using calcium hydroxide, preferably in the form of cheap agricultural hydrated lime, involves no special chemical treatment modifying it before use at the manufacturing stage, inasmuch as it has been found to fully possess needed properties 'as is'.

I claim:

1. A composition in the form of a powder for applying onto an open body of water in order to spread an evaporation suppressing monolayer upon said open body of water, wherein said composition is:

water-free;

said composition (a) and (b) components, where (a) is an aliphatic alcohol component having from 12 to 24 carbon atoms per molecule, and (b) is pre-powdered calcium hydroxide;

wherein, said (a) and (b.) components are in a ratio by volume of about 1 part aliphatic alcohol to 5 parts calcium hydroxide;

and said composition is in the form of particles of which at least 90% are fifty to one hundred microns in diameter;

whereby the said composition upon forming a monolayer, the said particles mutually repel one another.

* * * * *